(12) United States Patent
Hwang et al.

(10) Patent No.: US 7,742,470 B2
(45) Date of Patent: Jun. 22, 2010

(54) NETWORK RESOURCE REALLOCATION

(75) Inventors: Woonhee Hwang, Helsinki (FI); Jukka Marin, Espoo (FI)

(73) Assignee: Nokia Corporation, Espoo (FI)

( * ) Notice: Subject to any disclaimer, the term of this patent is extended or adjusted under 35 U.S.C. 154(b) by 1346 days.

(21) Appl. No.: 10/181,385

(22) PCT Filed: Nov. 20, 2001

(86) PCT No.: PCT/IB01/02751

§ 371 (c)(1),
(2), (4) Date: Nov. 13, 2002

(87) PCT Pub. No.: WO02/41573

PCT Pub. Date: May 23, 2002

(65) Prior Publication Data

US 2003/0093532 A1    May 15, 2003

(30) Foreign Application Priority Data

Nov. 20, 2000    (GB) ................................ 0028261.6

(51) Int. Cl.
*H04L 12/28* (2006.01)
*H04L 12/56* (2006.01)
*H04J 3/16* (2006.01)
*H04J 3/22* (2006.01)

(52) U.S. Cl. .................. 370/389; 370/392; 370/395.21; 370/468

(58) Field of Classification Search ............... 370/230, 370/395.43, 412, 270, 449, 346, 348
See application file for complete search history.

(56) References Cited

U.S. PATENT DOCUMENTS 4,256,925 A * 3/1981 Goode ........................ 370/322
4,568,930 A * 2/1986 Livingston et al. .......... 370/462

(Continued)

FOREIGN PATENT DOCUMENTS

| JP | 5-268240 | 10/1993 |
| JP | 8-237231 | 9/1996 |
| WO | WO 97/22213 | * 12/1996 |
| WO | WO 99/56475 | 11/1999 |

OTHER PUBLICATIONS

3GPP TSG RAN WG3 Meeting #16 Document R3-002869 Windsor, UK, Oct. 16-20, 2000.*

(Continued)

*Primary Examiner*—Ayaz R Sheikh
*Assistant Examiner*—Blanche Wong
(74) *Attorney, Agent, or Firm*—Banner & Witcoff Ltd.

(57) ABSTRACT

A method of assigning resources within a network element within which a traffic termination point or AAL2 termination point has been established is described. The network element accepts a connection request, and it is then ascertained whether available resources have sufficient capacity to establish the requested connection. In the event that there is sufficient capacity, it is ascertained whether the termination points defined in relation to the available resources fragments the resources such that the connection cannot be established. If the resources are so fragmented, then one or more of the termination points are reallocated, without breaking the connection to which they relate, thereby defragmenting the resources sufficiently that the requested connection can be established.

21 Claims, 2 Drawing Sheets

U.S. PATENT DOCUMENTS

| | | | | |
|---|---|---|---|---|
| 4,763,321 | A * | 8/1988 | Calvignac et al. | 370/236 |
| 4,965,798 | A * | 10/1990 | Mostafa et al. | 370/468 |
| 5,130,982 | A * | 7/1992 | Ash et al. | 370/352 |
| 5,737,009 | A * | 4/1998 | Payton | 725/93 |
| 5,875,172 | A * | 2/1999 | Tabata | 370/228 |
| 6,333,936 | B1 * | 12/2001 | Johansson et al. | 370/449 |
| 6,438,370 | B1 * | 8/2002 | Einola et al. | 455/422.1 |
| 6,466,556 | B1 * | 10/2002 | Boudreaux | 370/331 |
| 6,466,559 | B1 * | 10/2002 | Johansson et al. | 370/335 |
| 6,535,583 | B1 * | 3/2003 | Bobick et al. | 379/88.1 |
| 6,539,415 | B1 * | 3/2003 | Mercs | 718/104 |
| 6,542,516 | B1 * | 4/2003 | Vialen et al. | 370/465 |
| 6,639,916 | B1 * | 10/2003 | Wakizaka | 370/397 |
| 6,725,038 | B1 * | 4/2004 | Subbiah | 455/436 |
| 6,804,246 | B1 * | 10/2004 | Petersen et al. | 370/395.64 |
| 6,985,455 | B1 * | 1/2006 | Heath et al. | 370/316 |

OTHER PUBLICATIONS

3GPP TSG RAN WG3 Meeting #16 Document R3-002869, Windsor, UK, (Oct. 16-20, 2000).*

Eneroth, G., et al.; "Applying ATM/AAL2 As A Switching Technology In Third-Generation Mobile Access Networks"; XP000835287; IEEE Communications Magazine, IEEE Service Center, Piscataway, N.J., US; vol. 37, No. 6, Jun. 1999, pp. 112-122.

* cited by examiner

NETWORK RESOURCE REALLOCATION

FIELD OF INVENTION

The present invention relates to communications protocols, and, more particularly, to Asynchronous Transfer Modes (ATM) defined in specifications associated with UTRAN (UMTS Terrestrial Radio Access Network) standards defined by the 3$^{rd}$ Generation Partnership Project (3GPP).

The invention has been developed to provide an additional feature to the presently accepted and proposed specifications defined by 3GPP, and will be described herein with reference to those specifications. However, it will be appreciated that telecommunications is a rapidly developing field, and that the invention may well have application to new and different standards and specifications that evolve from the various standards presently accepted or being proposed. Accordingly, the invention should not be seen as limited to existing specifications.

BACKGROUND TO THE INVENTION

Various uses of ATM are defined in specifications issued by 3GPP. Of particular relevance is 3GPP TS 25.433 V3.3.0, the contents of which are incorporated herein by cross-reference.

ATM is a connection-oriented technique, comprising the concatenation of ATM layer links required to effect end-to-end transfers between access points. Connection identifiers are assigned to each link of a connection as required and released when no longer needed. In general, signalling and user information are carried on separate ATM connections. In the ATM modes, data to be transmitted is organised into cells.

At a given interface, in a given direction, the different Virtual Path (VP) links multiplexed at the ATM layer into the same physical layer connection are distinguished by a VPI. The different Virtual Channel (VC) links in a Virtual Path Connection (VPC) are distinguished by a VCI.

The AAL (ATM adaptation layer) performs functions required by the user, control and management planes and supports mapping between the ATM layer and the next higher layer. The functions performed in the AAL depend upon the higher layer requirements.

The AAL uses the ATM layer service and includes multiple protocols to fit the need of different AAL service users:

AAL1 supports constant bit rate (CBR), connection-oriented, time-dependent data traffic (circuit, video signal and voice-band signal transport);

AAL2 is an ATM adaptation layer that supports variable bit rate (VBR), connection-oriented, time-dependent data traffic. AAL2 supports packetised voice and VBR video transmission;

AAL3/4 supplies sequencing and error detection support to variable bit rate (VBR), time-independent data traffic. Traffic can be both connection-oriented and connectionless (computer and network data transport, for example Frame Relay and SMDS); and AAL5 supports variable bit rate (VBR), connection-oriented, time-independent data traffic (AAL5 does not support multiplexing, sequencing or error detection).

Termination points are managed objects that terminate entities, such as trails and connections. Technology-specific termination points are derived using subclassing. In ATM switching a termination point can be at the virtual path or virtual channel level, and it can be external or internal.

In the presently proposed UTRAN specification, a traffic termination point is determined either when a radio link is set up for a dedicated channel or a common transport channel is set up for a common channel. Each radio link has a traffic termination point, and each transport channel within each radio link may have its own AAL2 termination point. Similarly, each common transport channel has its own AAL2 termination point. Once a traffic termination or AAL2 termination point is defined, it is fixed for the duration of the connection.

In a Node B element, this fixing of termination points can generate a resource fragmentation problem. This means that even though a particular Node B element can have theoretically sufficient capacity to accept a requested high bandwidth call (such as a video call), but will need to reject the call because the available resources are scattered.

SUMMARY OF INVENTION

In accordance with a first aspect of the invention, there is provided a method of assigning resources within a network element within which a traffic termination point or AAL2 termination point has been established, the method including the steps of:

accepting a connection request via the network element;

ascertaining whether available resources have sufficient capacity to establish the requested connection;

in the event that there is sufficient capacity, ascertaining whether the termination points defined in relation to the available resources fragments the resources such that the connection cannot be established;

in the event that the resources are so fragmented, reallocating one or more of the termination points, without breaking the connection to which they relate, thereby defragmenting the resources sufficiently that the requested connection can be established.

In accordance with a second aspect of the invention, there is provided a network element having resources to be allocated, within which a traffic termination point or AAL2 termination point has been established, the network element being configured to:

accept a connection request;

ascertain whether the available resources have sufficient capacity to establish the requested connection;

in the event that there is sufficient capacity, ascertain whether the termination points defined in relation to the available resources fragments the resources such that the connection cannot be established;

in the event that the resources are so fragmented, reallocate one or more of the termination points, without breaking the connection to which they relate, thereby defragmenting the resources sufficiently that the requested connection can be established.

Preferably, prior to reallocating the termination points, it is determined which of the existing termination points should be reallocated to minimize fragmentation of resources within the network element, the termination points then being changed in accordance with that determination.

Preferably, reallocating the one or more termination points includes:

sending a Termination Point Switching Request (TPSR) message to a Radio Network Controller (RNC), the TPSR message including port information related to the termination points to be switched;

receiving from the RNC a Switching Request Commit (SRC) message, the SRC message including confirmation that the resource reallocation is to take place, and timing information for synchronization of the resource reallocation.

In a preferred embodiment, the TPSR includes one or more of the following:
   a Binding ID;
   a Transport Layer & Node B Communication Context ID; and
   a Communication Control Port ID.

Preferably, the network element is a Node B element in accordance with a 3GPP UTRA specification.

BRIEF DESCRIPTION OF DRAWINGS

A preferred embodiment of the invention will now be described, by way of example only, with reference to the accompanying drawings, in which.

DETAILED DESCRIPTION OF PREFERRED EMBODIMENT

Figure 2:
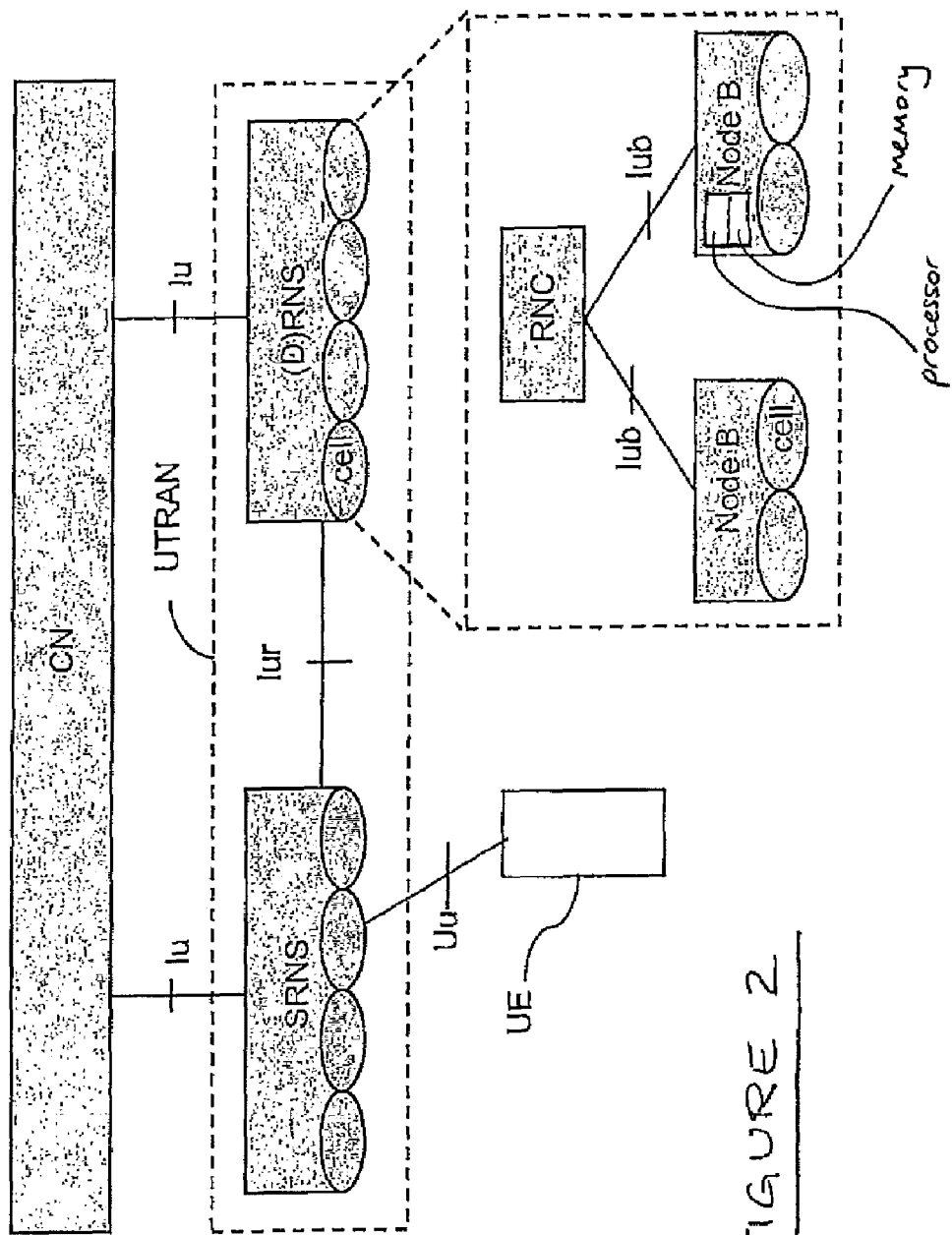
FIG. 2 is a schematic of UMTS architecture to which the invention has been applied.

In its preferred form, the invention is applied to a Node B network element, forming part of an UTRA-based radio communications network for mobile telephony and other types of data transfer, operative portions of which are shown in FIG. 2. A Core Network (CN) is connected to the UTRAN by an Iu interface. In the UTRAN, the Iu interface ends at the Radio Network Controller (RNC). RNCs are connected to each other by an Iur interface.

FIG. 2 shows two types of RNC: a Serving RNC (SRNC) and a Drift RNC (DRNC). The User Equipment is connected to the Node B by the air interface Uu and the Node B is connected to the RNC by Iub interface. All the interfaces are well specified to make the network work properly. The Iub interface is specified to use ATM and AAL2 transport mechanisms.

Figure 1:
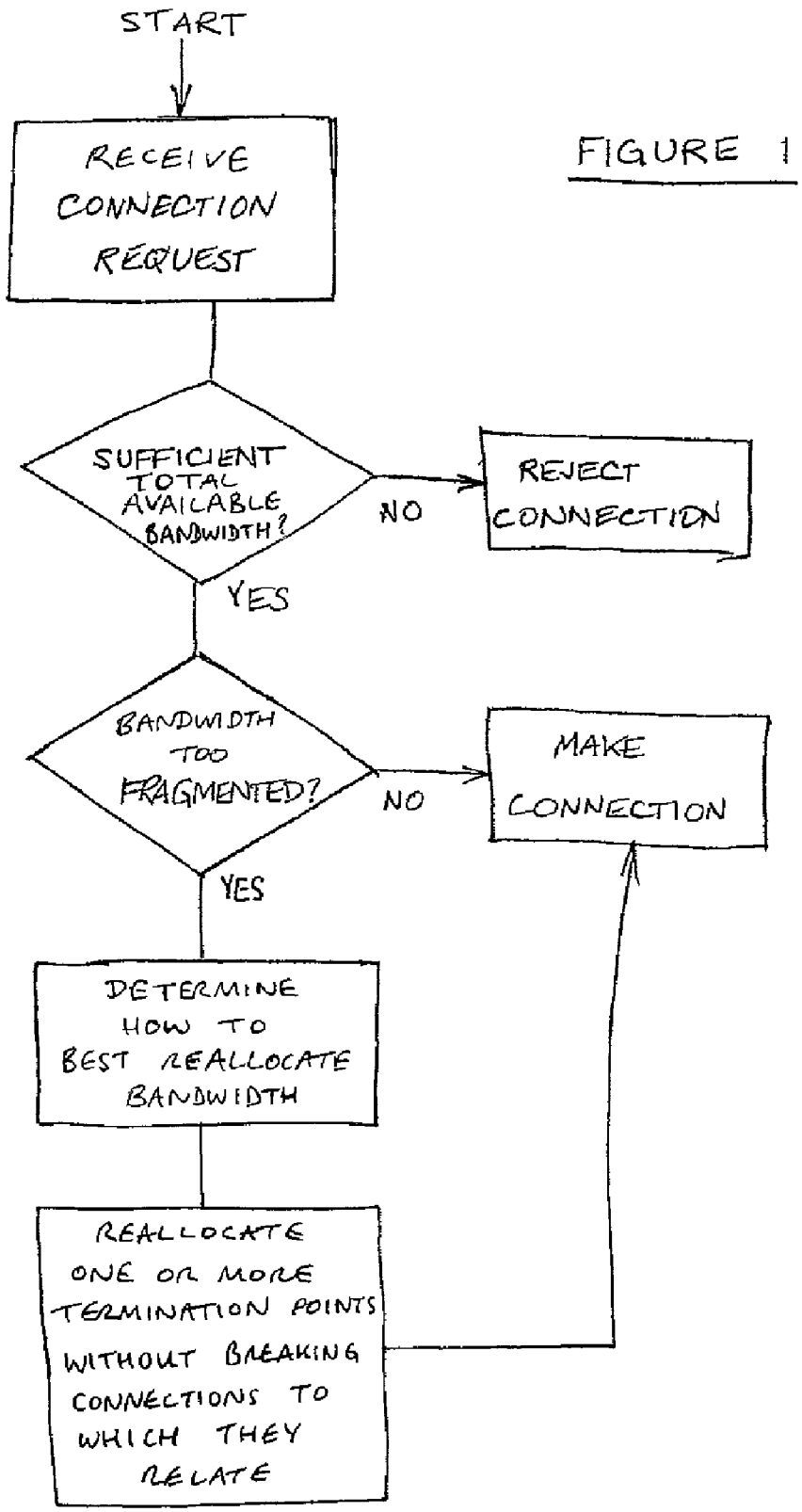
FIG. 1 is a flowchart showing the steps involved in a method of assigning resources within a network element within which a traffic termination point or AAL2 termination point has been established, in accordance with the invention.

The operation of the network shown in FIG. 1, in the context of the preferred embodiment, will now be described in relation to FIG. 1, in which the Node B network element (ie, a base station) receives a request for an AAL2 terminated connection. An AAL2 termination supports variable bit rate (VBR), connection-oriented, time-dependent data traffic. Typical examples of the types of data for which such connections would be used are packetised voice and VBR video transmission.

Upon receiving the request, the Node B ascertains whether the total network resources available at that point have sufficient bandwidth to carry the peak expected bandwidth for the data type the subject of the request. If sufficient bandwidth is available, and the way in which the termination points are allocated allows it, then the network resources sufficient for the requested connection are made available, and the connection established.

If, on the other hand, there are not sufficient resources available, the connection request is refused in the usual way. In prior art cases, the connection would also be refused in the event that there were sufficient resources, but the arrangement of terminations was such that the resources were too fragmented to be used by the requested (usually relatively high bandwidth) connection.

In the present case, if there is sufficient total bandwidth available, but previous allocations of available resources have fragmented the resources, the Node B ascertains how to best reallocate the resources to allow the new connection to be made. Depending upon the circumstances and implementation, for example, it may be preferable simply to defragment the resources only to the extent necessary to enable the presently requested connection to be made. Alternatively, a greater amount of defragmentation, ranging from slightly more than the minimum required up to complete defragmentation, may be undertaken. This could mean less of a delay in setting up new connections (subsequent to that presently requested) that might also not have been fulfilled without further defragmentation.

Once the desired reallocation of resources has been ascertained in the Node B network element, the element sends a Termination Point Switching Request (TPSR) message to Radio Network Controller (RNC). The TPSR message includes port information related to the specific termination points that the Node B has decided need to be reallocated. In the preferred form, the TPSR will include one or more of a Binding ID, a Transport Layer & Node B Communication Context ID, and a Communication Control Port ID. The actual combination of features will, however, vary between specific embodiments and applications.

The RNC will usually reply with a Switching Request Commit (SRC) message, which confirms that the resource reallocation is to take place. The SRC message also provides timing information enabling the Node B to synchronize the resource reallocation, such that the connections affected by the resource reallocations are maintained. The connection is then established in accordance with the timing information, ensuring that the reallocation is seamless to users of the system.

It will be appreciated that the invention can be applied to both traffic termination points and AAL2 termination points within a network element. In either case, the resource reallocation effectively results in switching of communication ports within the Node B network element.

Whilst the invention has been described with reference to a specific embodiment, it will be appreciated that the invention can be embodied in many other forms. For example, aspects of the invention may be embodied as computer readable instructions on one or more computer readable media.

The invention claimed is:

1. A method comprising:
   ascertaining whether resources of an apparatus include total available bandwidth sufficient to carry a peak expected bandwidth for a data type which is the subject of a received request for a connection, wherein the apparatus includes one or more communication ports at which one of more termination points are established and wherein the one or more termination points terminate a requested connection;
   in the event that the total available bandwidth is sufficient to carry the peak expected bandwidth for the data type which is the subject of the received request for a connection, but the arrangement of said one or more termination points is such that the total available bandwidth is too fragmented to be used by the requested connection, determining how to best reallocate the bandwidth among the one or more termination points to allow the requested connection to be established; and
   without breaking one or more connections to which said one or more termination points relate, rearranging said one or more termination points in accordance with a result of the determining of how to best reallocate the bandwidth among the one or more termination points to allow the requested connection to be established.

2. A method according to claim 1, further including:
prior to causing said one or more termination points to be reallocated, determining which of said one or more termination points should be reallocated to minimize fragmentation of the total available bandwidth; and
causing said one or more termination points to be reallocated in accordance with the determining of which of the one or more termination points should be reallocated to minimize fragmentation of the total available bandwidth.

3. A method according to claim 1, wherein causing the one or more termination points to be reallocated includes:
sending a termination point switching request message to a radio network controller, the termination point switching request message including port information related to one or more termination points to be reallocated;
receiving from the radio network controller a switching request commit message, the switching request commit message including confirmation that bandwidth reallocation is to take place, and timing information for synchronization of the bandwidth reallocation.

4. A method according claim 3, wherein the termination point switching request includes one or more of the following:
a Binding ID;
a Transport Layer & Node B Communication Context ID; and
a Communication Control Port ID.

5. A method according to claim 1, wherein the apparatus is a Node B element in accordance with a third generation partnership project universal mobile telecommunications system terrestrial radio access network specification.

6. A method according claim 1, wherein said one or more termination points established at communication ports within the apparatus comprise traffic termination points.

7. A method according claim 1, wherein said one or more termination points established at communication ports within the apparatus comprise AAL2 termination points.

8. A apparatus comprising:
a processor; and
memory operatively coupled to the processor and including computer program code that, when executed, cause the apparatus to:
ascertain whether resources of a node include total available bandwidth sufficient to carry a peak expected bandwidth for a data type which is the subject of a received request for a connection, wherein the node includes one or more communication ports at which one of more termination points are established and wherein the one or more termination points terminate a requested connection;
in the event that the total available bandwidth is sufficient to carry the peak expected bandwidth for the data type which is the subject of the received request for a connection, but the arrangement of said one or more termination points is such that the total available bandwidth is too fragmented to be used by the requested connection, determining how to best reallocate the bandwidth among the one or more termination points to allow the requested connection to be established; and
without breaking one or more connections to which said one or more termination points relate, rearranging said one or more termination points in accordance with a result of the determining of how to best reallocate the bandwidth among the one or more termination points to allow the requested connection to be established.

9. An apparatus according to claim 8, wherein the computer program, when executed, further causes the apparatus to perform:
determining, prior to reallocating said one or more termination points, which of said one or more termination points should be reallocated to minimize fragmentation of the total available bandwidth; and
causing said one or more termination points to be reallocated in accordance with the determining of which of the termination points should be reallocated to minimize fragmentation of the total available bandwidth.

10. An apparatus according to claim 8, wherein the computer program, when executed, further cause the apparatus to perform:
sending a termination point switching request message to a radio network controller, the termination point switching request message including port information related to termination points to be reallocated; and
receiving from the radio network controller a switching request commit message, the switching request commit message including confirmation that bandwidth reallocation is to take place, and timing information for synchronization of the bandwidth reallocation.

11. An apparatus according to claim 10, wherein the termination point switching request includes one or more of the following:
a Binding ID;
a Transport Layer & Node B Communication Context ID; and
a Communication Control Port ID.

12. An apparatus according to claim 8, wherein the node is a Node B element in accordance with a third generation partnership project universal mobile telecommunications system terrestrial radio access network specification.

13. An apparatus according to claim 8, wherein said one or more termination points established at communication ports within the node comprise traffic termination points.

14. An apparatus according to claim 8, wherein said one or more termination points established at communication ports within the node comprise AAL2 termination points.

15. A apparatus comprising:
means for ascertaining whether resources of a node include total available bandwidth sufficient to carry a peak expected bandwidth for a data type which is the subject of a received request for a connection, wherein the node includes one or more communication ports at which one of more termination points are established and wherein the one or more termination points terminate a requested connection;
means for determining how best to reallocate the bandwidth among the one or more termination points to allow the requested connection to be established, in the event that the total available bandwidth is sufficient to carry the peak expected bandwidth for the data type which is the subject of the received request for a connection, but the arrangement of said one or more termination points is such that the total available bandwidth is too fragmented to be used by the requested connection; and
mean for rearranging, without breaking one or more connections to which said one or more termination points relate, said one or more termination points in accordance with a result of the determining of how to best reallocate the bandwidth among the one or more termination points to allow the requested connection to be established.

16. An apparatus according to claim 15, further including:
means for determining, prior to reallocating said one or more termination points, which of said one or more termination points should be reallocated to minimize fragmentation of the total available bandwidth; and means for causing said one or more termination points to be reallocated in accordance with the determining of which of the termination points should be reallocated to minimize fragmentation of the total available bandwidth.

17. An apparatus according to claim 15, wherein the means for reallocating the one or more termination points includes:

means for sending a termination point switching request message to a radio network controller, the termination point switching request message including port information related to the termination points to be reallocated; and means for receiving from the radio network controller a switching request commit message, the switching request commit message including confirmation that bandwidth reallocation is to take place, and timing information for synchronization of the bandwidth reallocation.

18. An apparatus according to claim 17, wherein the termination point switching request includes one or more of the following:

a Binding ID;

a Transport Layer & Node B Communication Context ID; and a Communication Control Port ID.

19. An apparatus according to claim 15, wherein the node is a Node B element in accordance with a third generation partnership project universal mobile telecommunications system terrestrial radio access network specification.

20. An apparatus according to claim 15, wherein said one or more termination points established at communication ports within the node comprise traffic termination points.

21. An apparatus according to claim 15, wherein said one or more termination points established at communication ports within the node comprise AAL2 termination points.

* * * * *